June 7, 1938. C. E. LAUER ET AL 2,120,135
METHOD OF TREATING RESIDUAL PARAFFINIC OILS
Filed July 12, 1934
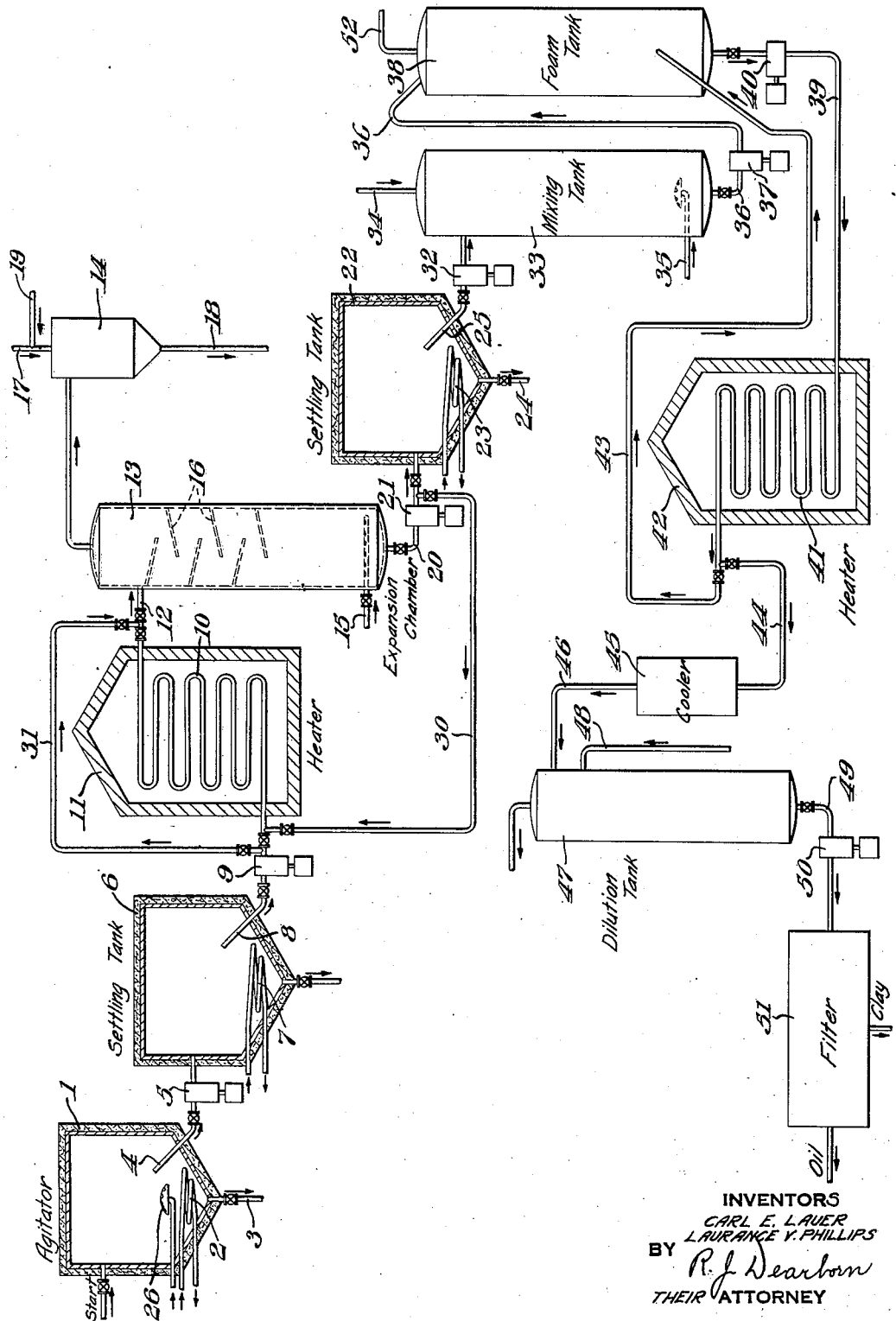
INVENTORS
CARL E. LAUER
LAURANCE Y. PHILLIPS
BY R. J. Dearborn
THEIR ATTORNEY Patented June 7, 1938

2,120,135

UNITED STATES PATENT OFFICE 2,120,135

METHOD OF TREATING RESIDUAL PARAFFINIC OILS

Carl E. Lauer and Laurance V. Phillips, Port Arthur, Tex., assignors to The Texas Company, New York, N. Y., a corporation of Delaware Application July 12, 1934, Serial No. 734,758

4 Claims. (Cl. 196—40)

This invention relates to the treatment of petroleum oils for the manufacture of lubricating oils, and concerns more particularly the treatment of residual oils obtained by the distillation of paraffin or semi-paraffin base crude for the production of cylinder stocks.

In the treatment of residual oils for the manufacture of cylinder stocks it is a well known practice to subject it to treatment with strong sulfuric acid. The oil may be agitated by blowing with air to facilitate thorough mixing with the acid, and after the reaction is complete, it may be allowed to settle for a period of several hours to permit most of the sludge formed during the treatment with acid to separate. Because of the high viscosity of this type of oil it is the usual practice to heat the oil to a temperature of the order of 100° F., depending on the particular oil to be treated, to lower the viscosity of the oil and thereby facilitate separation of the sludge. After separating most of the sludge, by settling, it is customary to blow the oil with air to separate the volatile products of reaction, including sulfur dioxide.

It has been found that after most of the sludge has been settled out of the oil, there remains in the oil a considerable amount of fine pepper-like sludge which because of its fine state of subdivision cannot be separated from the oil by gravity, even after many days of settling. There also remains in the oil certain products of the reaction which are soluble in the oil, and which it is desirable to remove from the oil in order to make the oil neutral and to improve the color thereof.

In order to neutralize residual oils which have been treated in the above manner, and also to improve the color thereof, it has been the practice heretofore to mix the treated oil, which contains the pepper-like sludge particles and the oil soluble products of the reaction above referred to, with a comminuted solid adsorbent material, such for instance as colloidal clay, fullers' earth, acid treated clay, or a kindred substance and then to heat the mixture to a temperature of the order of 450-500° F. The function of the comminuted solid adsorbent material, in admixture with the oil undergoing heating, is to adsorb certain of the acid and color forming compounds which are present in the oil. The adsorbent material is then removed from the oil by filtration.

In the treatment of residual stocks by the method described above, it has frequently been found necessary to use very large proportions of the adsorbent material in order to secure commercial filtration rates. For example, it has been found necessary, in some instances, to use as much as 30-35 lbs. per barrel of acid treated clay on such residual stock to secure what was considered to be a commercially feasible rate, whereas it was found that only 7-10 lbs. of the adsorbent per barrel of oil was necessary to produce the desired neutralization and decolorizing. By utilizing our present invention it has been found possible to reduce the amount of adsorbent material so that it approaches the lower range of proportions while still making it possible to operate at commercial filtration rates. Inasmuch as adsorbent material is an expensive reagent, the saving made possible by our process is very considerable.

We have found that these beneficial results may be secured by removing the fine pepper-like sludge remaining in the acid treated oil prior to the contact filtration step. This is accomplished preferably by heating the oil containing the fine particles of sludge to a temperature in excess of 300° F. and preferably within the range of 450-500° F. and then permitting the oil to settle whereby the major portion of the sludge is coagulated and will settle by gravity from the bulk of the oil. The latter is then decanted, mixed with the desired proportion of adsorbent material and this mixture is then heated to effect complete neutralization and decolorizing. The adsorbent is then removed by filtration in the usual manner.

The method of the invention will be described in further detail with reference to the accompanying drawing:

Referring to the drawing, a vessel 1 is shown in which a residual oil may be subjected to treatment with strong sulfuric acid in the usual manner. A steam coil 2 is provided for heating the oil, to lower the viscosity of the oil and thereby facilitate separation of the sludge. The vessel also may be insulated. The oil may be heated during such treatment to a temperature of the order of 100° F., for the purpose stated. The oil may be agitated by blowing with air in the usual manner, to accelerate the reaction with the acid. An air spider 26 is provided for this purpose. After the reaction is complete, it may be allowed to settle for a period of several hours to permit most of the sludge formed during the treatment with acid to separate. The separated sludge may be withdrawn through a line 3. After separating most of the sludge, by settling, the oil may be blown with air to separate the volatile products of reaction, including sulfur dioxide.

After further settling to separate additional sludge, the treated oil may be withdrawn through a line 4 and delivered by the pump 5 into a settling tank 6, which preferably is insulated, and is provided with a steam coil 7, in which the oil may be kept at a fluid temperature and allowed to settle for several days to remove additional sludge.

Up to this point the method described of treating the residual oil is not new, but is commonly practiced. The acid treated oil may now be withdrawn from the tank 6 through a line 8 and delivered by a pump 9 into a heating coil 10 which may be situated in a suitable furnace 11. In the heating coil 10 the oil may be heated rapidly, and without substantial decomposition to a temperature in excess of 300° F., preferably to a temperature of the order of 450–500° F. The heated oil may be withdrawn from the heating coil 10 through a line 12 and delivered into a suitable expansion chamber 13. The chamber 13 may be maintained at a subatmospheric pressure by means of a vacuum jet 14 which serves to eject the volatile products of decomposition, including sulfur dioxide, from the oil. Steam or other inert gas, such as flue gas, may be introduced into the expansion chamber 13 through a line 15, to assist in removing the volatile products of decomposition. The expansion chamber 13 may be provided with suitable baffles 16 over which the hot oil may flow, in a zigzag path, to effect vaporization and liberation of the sulfur dioxide and other volatile matters. The acidic vapors withdrawn from the chamber 13 may be condensed and adsorbed by a stream of water entering the vacuum jet 14 through a line 17, and withdrawn therefrom through a line 18. In order to effect neutralization of the condensed vapors, and prevent damage to equipment by corrosion, a suspension or solution of lime or other alkaline material from a source not shown may be injected into the water line 17, through a line 19.

The heated oil, with substantially all of the sulfur dioxide and other volatile matters removed, may be withdrawn from the chamber 13 through a line 20, and delivered by a pump 21 into a settling tank 22 which preferably is insulated and is provided with a steam coil 23.

In an alternative mode of heating the oil delivered to the chamber 13, a portion of the oil withdrawn from the chamber 13, through the line 20, may be delivered through a by-pass line 30 to the heating coil 10. Such portion of the oil may be heated in the coil 10 to an appropriately high temperature which may be of the order of 450–500° F. and then delivered through the line 12 into the chamber 13. The oil withdrawn from the tank 6, and which contains pepper and dissolved sludge, may be heated by admixture with the heated oil in the line 12 and in the chamber 13. A by-pass line 31 is provided for connecting the line 8 from the tank 6 with the line 12 and the chamber 13. In this manner the normally corrosive effects of the decomposing sulfur compounds, which may obtain when heating the oil in the coil 10, may be avoided.

We have discovered that the method of treating above described is effective in coagulating substantially all of the fine pepper-like sludge remaining in the oil after acid treating, so that it may be separated from the oil by settling, as in the tank 22. We have also found that it is effective in accomplishing a substantial decomposition of the acid compounds remaining in the oil after acid treating and that certain of the products of such decomposition are insoluble in the oil and may readily be separated therefrom by settling. After settling the sludge may be withdrawn from the tank 22 through a line 24, and the treated oil may be withdrawn through a line 25. During this settling step the oil is preferably cooled to about 180–250° F.

The oil withdrawn from the tank 22 may be treated with acid treated clay for completing its neutralization and decolorization by the well known clay contacting method. This method of treatment, when practiced in combination with the method of the present invention as above described, permits of a substantial reduction in the amount of clay required for neutralization, decolorization and to secure commercial filtration rates.

The treated oil may be withdrawn from the tank 22 through the line 25, and delivered by means of a pump 32 into a mixing tank 33 where it may be admixed with acid treated adsorptive clay. The clay may be in admixture with water, in the form of a mud or pulp, and may be introduced into the tank through a line 34. Flue gas may be used for mixing the oil with the clay. The flue gas may be delivered into the mixing tank 33 through a line 35.

The mixture of oil and adsorptive clay may be withdrawn from the mixing tank 33 through a line 36, and delivered by means of a pump 37 into a foam tank 38 where the water associated with the clay may be evaporated from the mixture, and the volatile products of decomposition separated from the oil. The foam tank 38 may be maintained at a temperature of the order of 450° F. so that the oil entering the tank will be immediately separated from the water and acid compounds associated therewith. The temperature in the foam tank 38 may be maintained by withdrawing a portion of the oil therefrom, through a line 39, circulating a portion of the oil so withdrawn, by means of a pump 40, through a heating coil 41 situated in a suitable furnace 42, and returning it through a line 43 to the foam tank 38. The volatile products of decomposition and the vaporized water may be withdrawn from the foam tank 38 in any suitable manner through the line 52.

A portion of the heated oil may be continuously delivered from the heating coil 41, through the line 43 and a by-pass line 44, to a cooler 45, through which it is passed. The cooled oil from the cooler 45 may be delivered through a line 46 into a dilution tank 47 where it may be diluted with naphtha introduced through a line 48 so that it may be readily filtered to separate the adsorptive clay. The diluted oil may be withdrawn from the dilution tank 47 and delivered through a line 49, by means of a pump 50, to a suitable filter 51, for separating the oil from the adsorptive clay.

By processing the residual oil in the manner described it is possible to reduce the amount of acid treated clay required to neutralize and decolorize the oil to one-third to one-fifth the amount required by the process as heretofore practiced. For example, a residual oil, which has been treated with acid and thoroughly settled in the settling tank 6, has been found to have a neutralization number of 3.25 and a mineral acidity of 0.11%. After heating the same, according to the method described, to a temperature of about 500° F., the oil collecting in the settling tank 22 has been found to have a neutralization number of 0.25 and a mineral acidity of only a trace. In order to secure commercial filtering rates, following the clay treating step, it has been found necessary to mix from 30 to 35 lbs. of clay per barrel to the acid oil collecting in the settling tank 6, whereas in similarly processing the oil collecting in the settling tank 22, it has been found necessary to use only from 7 to 10 lbs. of clay per barrel of oil to secure similar filtration rates while still securing neutralization of the oil and decolorizing to the desired extent.

Obviously many modifications and variations of the invention, as herein set forth, may be made without departing from the spirit and scope thereof, and therefore, only such limitations should be imposed as are indicated in the appended claims.

We claim:

1. The method of treating residual paraffinic oils for the manufacture of cylinder stocks comprising treating the oil with sulfuric acid, removing the bulk of the resultant sludge, then heating the oil to a temperature of about 450–500° F. in the absence of added agglomerating and neutralizing agents to coagulate the fine pepper-like sludge remaining in the oil and to decompose acid compounds contained therein, flashing the heated oil in an expansion chamber, separately withdrawing the volatile products of decomposition and the oil from the chamber, and settling the oil and separating the same from the coagulated sludge.

2. The method of treating residual paraffinic oils for the manufacture of cylinder stocks which comprises treating the oil with sulfuric acid, removing the bulk of the resultant sludge, heating the oil to a temperature of about 450–500° F. to coagulate the fine pepper-like sludge remaining in the oil and to decompose acid compounds contained therein, settling the oil and separating the same from the coagulated sludge, mixing the oil with a comminuted solid adsorbent material, heating the mixture to neutralize and decolorize the oil, and then separating the adsorbent material from the purified oil.

3. The method of treating residual paraffinic oils for the manufacture of cylinder stocks which comprises treating the oil with sulfuric acid, removing the bulk of the resultant sludge, heating the oil to a temperature of about 450–500° F. to coagulate the fine pepper-like sludge remaining in the oil and to decompose acid compounds contained therein, flashing the heated oil in an expansion chamber, separately withdrawing the volatile products of decomposition and the oil from the chamber, settling the oil and separating the same from the coagulated sludge, thereafter mixing the oil with a comminuted solid adsorbent material, heating the mixture to neutralize and decolorize the oil, and then separating the adsorbent material from the purified oil.

4. The method of treating residual paraffinic oils for the manufacture of cylinder stocks comprising treating the oil with sulfuric acid, removing the bulk of the resultant sludge, then heating the oil to a temperature of about 450–500° F. in the absence of added agglomerating and neutralizing agents to coagulate the fine pepper-like sludge remaining in the oil and to decompose acid compounds contained therein, and separating the oil from the coagulated sludge whereby an oil of low acidity is produced.

CARL E. LAUER.
LAURANCE V. PHILLIPS.